Patented Feb. 28, 1933

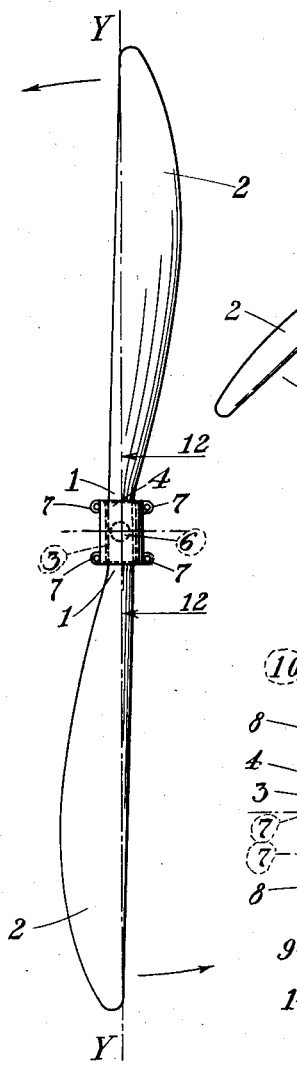
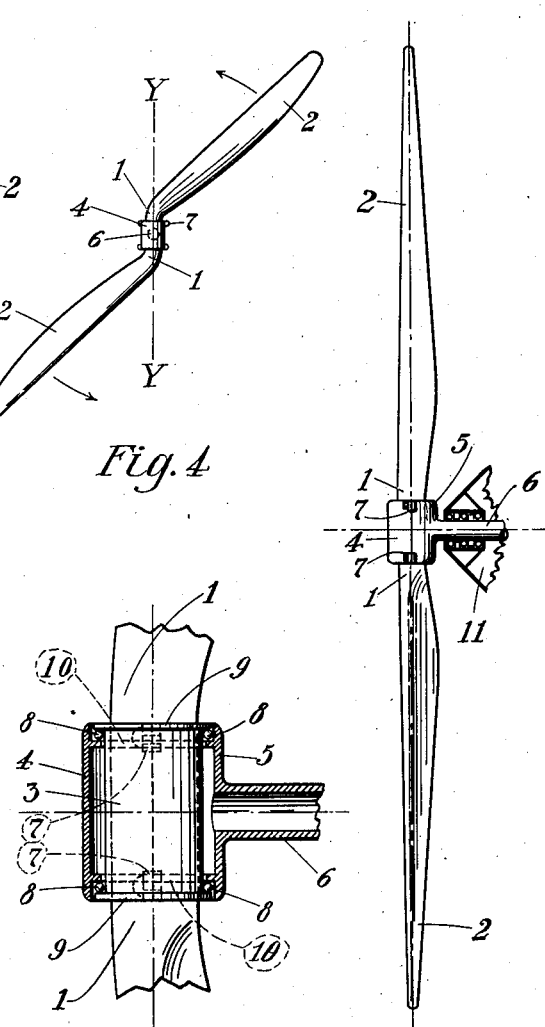
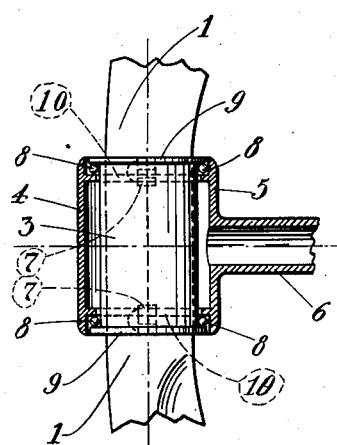
Fig. 1  Fig. 3  Fig. 2  Fig. 4

1,899,650

UNITED STATES PATENT OFFICE

WILLIAM STELZER, OF CHICAGO, ILLINOIS, ASSIGNOR TO AMERICAN PROPELLER COMPANY, OF BALTIMORE, MARYLAND, A CORPORATION OF MARYLAND

PROPELLER

Application filed April 21, 1928. Serial No. 271,820.

The invention relates to improvements of propellers operating yaw, i. e. in movement relative to the air in a line oblique to the line of the shaft, specifically when such angle of obliquity is large, as in case of helicopter flight with the propeller serving for both sustentation and traction, and also in flight of other types of aircraft subjected to yaw, as airplanes and aerostats.

The objects of the improvements are, first, to support the propeller rotatably in a bearing whose centroidal axis is parallel to the centroids of the propeller blades and perpendicular to the propeller axis; second to give the blades such a form, that the line of action upon which the airforce acts, i. e. the center of pressure of the propeller section is between the centroidal axis of the above mentioned bearing and the trailing edge of the blades, to effect continuous mutual balancement of the blades.

It is well known that present day propellers designed for normal strain, besides exerting a lateral or side thrust acting from the shaft to its bearings, flutter when operating under conditions of movement oblique to the propeller axis due to the lack of symmetry of the air stream relative to the propeller shaft and the resulting lack of symmetry between the two opposite blades of the propeller in their relation to the air stream.

The aim of my present invention is to obtain an equal force in each blade and to eliminate fluttering. I attain this by the simple arrangement of parts described in particular hereinafter; whereas the forwardly moving blade, which produces a greater force reaction than the other, will increase the angle of attack of the latter and decrease its own until the reaction is equal on both blades.

Another object is to make the propeller reversible in its position in order that it may serve as a brake after landing on the ground; so that when the rotation of the drive-shaft is reversed by means of reversing gear, the propeller will turn automatically 180° and face backward, whereby the full efficiency is used to bring the aircraft to a halt.

Further objects of the invention will appear in the following detailed description and the accompanying drawing wherein:

Fig. 1 shows a front view of the improved propeller,

Fig. 2 a side view,

Fig. 3 a cross section along the line 12—12 of Figure 1, and

Fig. 4 a front view of a modified form of the invention.

Similar reference characters refer to similar parts throughout the several views of the drawing.

The terms employed herein are used in the generic and descriptive sense and therefore are not intended primarily as terms of limitation.

The roots 1 of the blades 2 are rigidly secured to the metal sleeve 3 turning freely in a divided bearing consisting of the bearing cap 4 and the casing 5 formed on to the driveshaft 6 supported by a frame 11, which may be part of the power plant or aircraft. From the bearing cap 4 and the casing 5 project the lugs 7 provided to receive screws or any other appropriate means to secure the parts 4 and 5 together, which, with the balls 8, form an antifriction bearing for the propeller, so that it may turn freely and react instantly upon the fluctuations of the relative wind velocities. The flanges 9 at the terminations of the sleeve 3 and the flanges 10 projecting from the casing 5 and the adjacent bearing cap 4, besides serving as a reinforcement, keep the balls 8 in the proper place and also prevent motion endwise of the sleeve 3.

It is evident that a propeller equipped with the described improvement, but with a present day arrangement of the blades, would produce no balancing effect, but would even turn into any position. To attain the desired object, the largest part of the blade surface is located rearward of the bearing axis Y—Y, whereby the line of action upon which the airforce acts, is between the bearing axis Y—Y and the trailing edges of the blades. In this arrangement the airforce acting on one blade tends to decrease the angle of attack, but is counterbalanced by the airforce acting on the opposite blade. Now as the airforce on one blade increases,—due, for instance, to lack of symmetry of the air stream relative to the propeller axis—the angle of attack decreases in this blade and consequently increases in the other. As it is known that the angle of attack is a factor of the resultant force, it may be readily understood that the decrease of the angle of attack of the blade with greater reaction and the increase of the angle of attack of the other brings about an approximation of the reactions acting on the two blades.

In Fig. 4 a modification of the invention is illustrated showing the leading edge of the blades 2 at an acute angle with the axis Y—Y of the bearing. The object of the arrangement may be seen readily as the beating motions of the blades, due to the lack of symmetry of the air stream relative to the propeller shaft and the resulting lack of symmetry between the two opposite blades of the propeller in their relation to the air stream, will add to the balancing effect caused by the automatic adjustment of the angle of attack. Another feature is due to the resulting gyrostatic action upon the blades, by preventing any possible oscillation of the propeller.

While there are herein shown and described the preferred embodiments of my invention, it shall nevertheless be understood that changes may be made without departing from the scope of the invention; some of the most obvious modifications will be briefly stated:

In this preferred embodiment described hereinbefore a bearing embracing the propeller-blade roots has been employed in order to permit the propeller to face backward when the rotation of the drive-shaft has reversed, to stop the aircraft after alighting; nevertheless, other suitable means for connecting the propeller rotatably to the drive-shaft may be employed, such as hinges, or joints connected by pins.

While by constructing a wooden propeller it will be desirable to carve it from one piece of laminated wood and thus make the sleeve 3 of two portions, by making the blades of metal, the said sleeve 3 may be used as shown diagrammatically in the drawing and serve as a medium for rigid connection of the two blades.

To conform with the different types of aircraft, the propeller rake may suitably be varied, as it has no effect upon the dominant features of the invention.

It shall be well understood that changes may be made for the different kinds of applications, such as for helicopters, aerostats, airplanes, or marine vessels. Therefore I do not desire to be limited in the application of my invention, nor in the appended claims, to the particular embodiment pointed out in the affixed drawing.

Further embodiments, modifications and variations may be resorted to within the spirit and scope of the invention as here claimed.

I claim:

1. A revoluble propeller for aircraft comprising a plurality of blades having tapered tip portions, means for rigidly interconnecting said blades adjacent the inner ends thereof with said blades substantially axially aligned, and means for rotatably supporting said interconnected blades the said blades being angularly disposed with respect to the rotational axis of said blades.

2. An air craft propeller comprising a plurality of blades, means for rigidly securing the inner ends of said blades together the said blades lying substantially in the same plane, a hub, means for rotatably supporting the first-named means in said hub said supporting means maintaining the blades at acute angles with respect to the axis about which the said blades are rotatable, the leading edges of the blades being more closely adjacent the said axis than the trailing edges.

3. An air craft propeller comprising a plurality of rigidly interconnected blades the said blades lying substantially in the same plane, and means for rotatably mounting said interconnected blades, each of said blades being angularly disposed with respect to the axis about which the blades are rotatable.

4. A propeller for aircraft comprising a pair of blades having tapered tip portions, means for rigidly interconnecting the blades in such a manner that the blades will lie in substantially the same plane, means for rotatably mounting the interconnected blades, each of the blades being angularly disposed with respect to the axis about which the blades are rotatable and having the leading edges thereof more closely adjacent the said axis than the trailing edges.

WILLIAM STELZER.